United States Patent [19]

Morino et al.

[11] 4,185,170
[45] Jan. 22, 1980

[54] PROGRAMMABLE SYNTHETIC-SPEECH CALCULATORS OR MICRO COMPUTERS

[75] Inventors: Masuaki Morino, Nara; Shintaro Hashimoto, Nara, both of Japan

[73] Assignee: Sharp Kabushiki Kaisha, Japan

[21] Appl. No.: 900,200

[22] Filed: Apr. 26, 1978

[30] Foreign Application Priority Data

Apr. 30, 1977 [JP] Japan .................................. 52-51544
Apr. 30, 1977 [JP] Japan .................................. 52-51545

[51] Int. Cl.² .............................................. G06F 3/16
[52] U.S. Cl. .................................. 179/1 SM; 364/710
[58] Field of Search ............ 179/1 SM; 364/200, 710, 364/900

[56] References Cited

U.S. PATENT DOCUMENTS 4,016,540   4/1977   Hyatt ................................ 179/1 SM Primary Examiner—Thomas W. Brown
Assistant Examiner—E. S. Kemeny
Attorney, Agent, or Firm—Birch, Stewart, Kolasch & Birch

[57] ABSTRACT

A programmable synthetic-speech calculator or micro computer operable in either a normal calculation mode or a program mode releases a sound in response to actuation of keys on a keyboard only when the calculator operates in the program mode.

8 Claims, 2 Drawing Figures

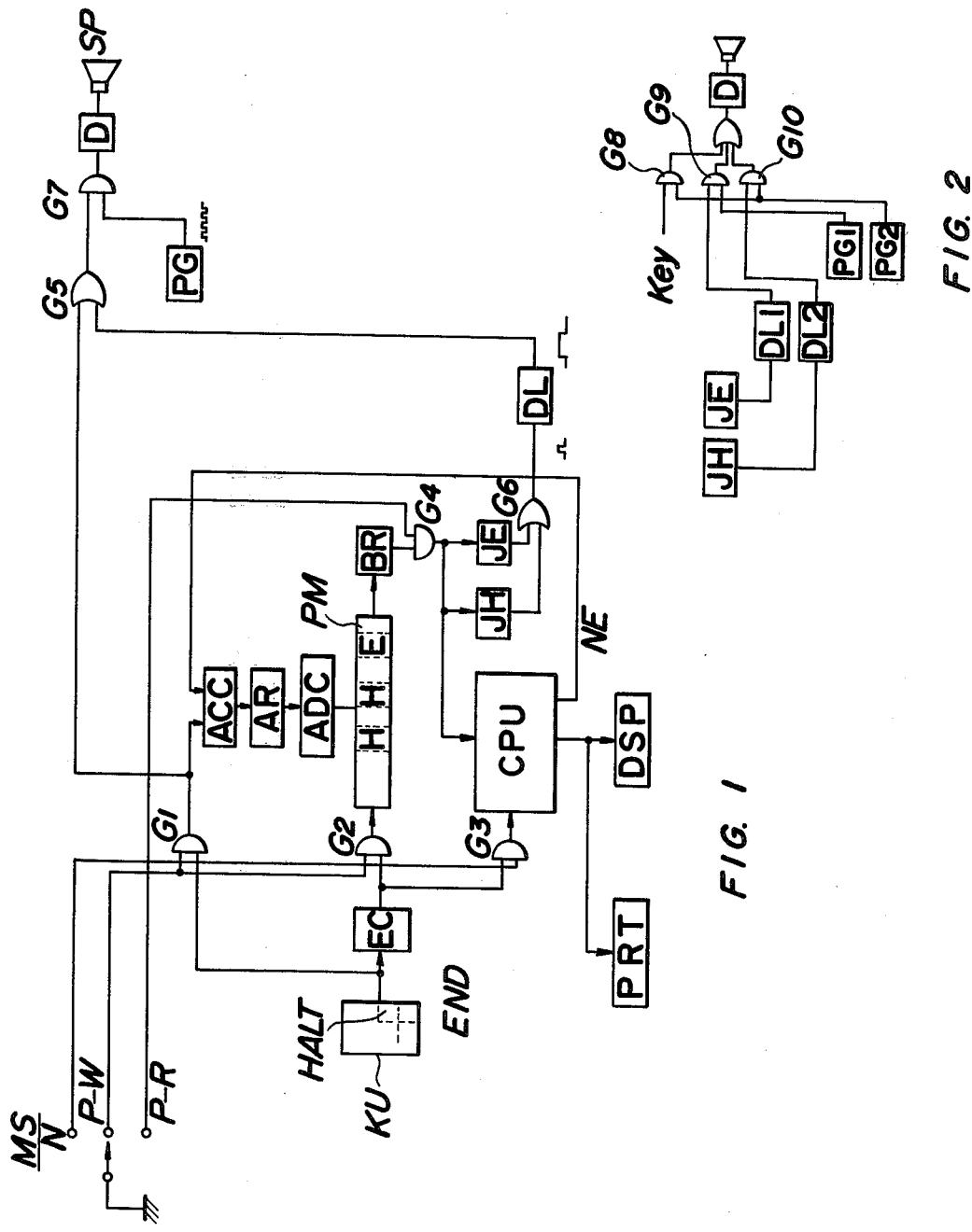

PROGRAMMABLE SYNTHETIC-SPEECH CALCULATORS OR MICRO COMPUTERS

BACKGROUND OF THE INVENTION

The present invention relates to a programmable synthetic-speech calculator or micro computer capable of releasing synthesized sound only when the calculator or micro computer operates in a program mode.

It is known in the art of electronic calculators that synthesized sound signals may be released in response to depression of a specific key in a general calculation mode (or a normal mode). Calculations executed in the normal mode are almost always momentary and information keyed can be visually checked while an operator watches a visual display provided on a display panel. Generating sound signals indicative of information keyed is harsh to the operator's eye. To prevent this there can be provided a switch for selecting a sound bearing mode or a non sound bearing or silient mode. However, this switch is somewhat complicated in terms of operation.

For programmable calculators it is not permitted to erroneously load an incorrect program into calculators by depressions of incorrect keys. Once a specific program has been entered calculations will be performed in accordance with such a program. In addition, it is bothersome to check the contents of the loaded program whenever desired. Program information keyed can not be easily confirmed during entry of that program information in a prior art programmable calculator although being visually displayed in the form of symbols or characters.

It is also obvious to provide multi-function keys such as [cos/2] along with a distinction key [F] available to establish a distinction between the functions assigned by the multi-functions. For example, when keys [F] and [cos/2] are sequentially operated in order to designate "cos", a program memory is not necessarily loaded with key codes indicative of the key [F] and, then upon further depression of the key [cos/2], is permitted to store key codes indicative of the designated function "cos" through a synthesis process. In this case a visual display of program instructions remains unchanged even upon depression of the key [F] and the instruction "cos" is thereafter displayed upon depression of the key [cos/2]. Therefore, whether the key [F] has been actuated can not be visually determined nor confirmed.

An END instruction for completing a specific program and a HALT instruction to enable the user to enter new information during the execution of calculations are useful instructions in programmable calculators. Since program or complicated calculations need a substantially long period of time to complete (for example, ranging from more than one minute to more than one hour), whether there is the END code can only be determined by watching the display panel throughout the long period of time. Similarly, it is not predictable when the halt condition is reached.

Accordingly, it is an object of the present invention to provide a programmable synthetic-speech calculator or micro computer provided with a means for releasing synthetic sounds in response to actuation of keys on a keyboard means only when operating in a program mode.

Synthetic sounds indicative of an END instruction, a HALT instruction, a PAUSE instruction, a JUMP instruction and other particular program instructions man also be generated in accordance with the present invention.

BRIEF DESCRIPTION OF THE DRAWINGS

A better understanding of the invention may be had from a consideration of the following detailed description taken in conjunction with the accompanying drawings in which:

FIG. 1 is a schematic diagram of a programmable synthetic-speech calculator embodying the present invention; and FIG. 2 is a block diagram of another example of a detector employed within the embodiment of FIG. 1.

DETAILED DESCRIPTION OF THE INVENTION

In FIG. 1, there is illustrated an embodiment of the present invention wherein a mode selector MS has three switching terminals with N designating the normal mode, P-W designating the program write mode and P-R designating the program read mode. A keyboard unit KU includes a HALT instruction key, an END instruction key and other function and digit keys as is well known in the art. The illustrated embodiment further comprises a key encoder EC, a program memory PM, an address register AR for the program memory PM, an address decoder ADC, an address selection circuit ACC, an output buffer register BR, a central processor unit CPU, and END code detector JE, a HALT code detector JH, a display and display control DSP, a printer and printer control PRT, a signal delay circuit DL, an oscillator PG for the generation of sound signals, a loud speaker SP, a speaker driver D, AND gates $G_1$ to $G_4$ and $G_7$ and OR gates $G_5$ and $G_6$.

While the mode selector switch MS is in the normal mode N, an input from a depressed key of the keyboard unit KU is encoded via the encoder EC and introduced into the central processor unit CPU through the AND gate $G_3$, providing a proper control in accordance with the introduced input. Results of calculations called for by depressed keys are read out on the display DSP or the printer PRT.

On the other hand, when the mode switch MS is in the program write mode P-W, the AND gate $G_2$ is enabled and information keyed in the keyboard unit KU and encoded via the encoder EC is stored in sequence into the program memory PM. The designation of the proper address for the information to be stored in the program memory PM is determined by the address register AR.

During the program write mode P-W the AND gate $G_1$ is also enabled and the address counter AR is incremented through the address selection circuit ACC each time any key of the keyboard unit KU is depressed. As a result, key codes are sequentially loaded into the program memory PM. The address register AR is specified in response to energization of the AND gate $G_1$ and the OR gate $G_5$ and $G_7$ are enabled to permit the output of the oscillator PG to enter the speaker driver D. The loud speaker SP will release sound signals each time any key is depressed. Audible sound signals are derived during the P-W mode because the AND gate $G_1$ is linked to the keyboard unit Ku, to the program write terminal of the mode selector switch (P-W), and indirectly to the loud speaker.

When the calculator is placed in the program read mode P-R and a program start key (not shown) is operated, the address register AR is restored to its initial step by the address selection circuit ACC. The contents of the address register AR at the initial step are transferred from the program memory PM to the output buffer register BR. The output of the buffer register BR enters the central processor unit CPU, executing an instruction at that step.

Upon the completion of that instruction the central processor unit CPU develops a signal NE which is introduced into the address selection circuit ACC to make the address register AR ready for the next succeeding step. This procedure is repeated to execute all the instructions stored in the program memory PM. The AND gate $G_4$, enabled during the program read mode P-R, renders the buffer register BR and the central processor unit CPU operative. The contents of the buffer register BR are checked by the HALT code detector JH and the END code detector JE.

In the presence of the HALT instruction the HALT code detector JH develops an output thereof to enable the OR gate $G_6$, thereby permitting the signal delay circuit DL to produce a signal of a given period of duration which determines a period of time of speaker sounds. The output of the signal delay circuit DL is supplied to the input of the AND gate $G_7$ via the OR gate $G_5$ so that the loud speaker SP releases audible sound signals for the given period in response to the signals derived from the oscillator PG.

If the END instruction is derived, the END instruction is sensed through the END code detector JE, releasing audible sounds therefor.

Another example of the detectors JE and JH shown in FIG. 2 is adapted to establish a distinction between the detection of the HALT code and that of the END code. Two oscillators $PG_1$ and $PG_2$ are provided as a source of sound. For example, two different frequencies may be selected or only one of them may be adapted to produce intermittent sounds. The END code detector JE and the HALT code detector JH are appropriately combined with gates $G_8$ and $G_9$ via delay circuits $DL_1$ and $DL_2$, respectively.

Sometimes a PAUSE instruction is useful for programmable synthetic-speech calculators, which prohibits of execution of programmed calculations for a desired period of time and allows the execution of the succeeding programmed calculations after a lapse of the desired period. The above mentioned detector can be also implemented to sense the PAUSE instruction. Of course, the present invention is applicable to treatment of a well known JUMP instruction.

The speech synthesis technique is fully disclosed in many of U.S. Patents, for example U.S. Pat. No. 3,102,165, SPEECH SYNTHESIS SYSTEM to Genung L. Clapper and U.S. Pat. No. 3,398,241, DIGITAL STORAGE VOICE MESSAGE GENERATOR to Lyle H. Lee.

While particular representative embodiments and details have been shown for the purpose of illustrating the present invention, it will be apparent to those skilled in this art that various changes and modifications may be made without departing from the spirit and scope of the invention. Accordingly, the foregoing embodiments are not to be taken as delimiting examples but as exemplary structures of the invention defined in the claims.

What is claimed is:

1. A programmable calculator having a normal mode, a program read mode, and a program write mode, comprising:

a housing;

actuator switch means on said housing for selecting one of said normal mode, said program read mode and said program write mode, respectively;

a keyboard on said housing;

audible sounding means responsive to selection of said program write mode via said actuator switch means and to actuation of keys on said keyboard for generating a first audible sound indicative of each actuation of each of said keys on said keyboard, actuation of each of said keys storing program instruction data into a memory of said programmable calculator in response to selection of said program write mode via said actuator switch means, said program instruction data including a specific program instruction;

processing means responsive to selection of said program read mode via said actuator switch means and to an output from said memory for processing said program instruction data stored in said memory;

detector means responsive to selection of said program read mode and to an output from said memory for detecting the occurrence of said specific program instruction in said program instruction data during processing by said processing means thereby generating an output signal indicative of the occurrence of said specific program instruction; and said audible sounding means generating a second audible sound in response to said output signal from said detector means indicative of the occurrence of said specific program instruction encountered during processing of said program instruction data by said processing means.

2. The programmable calculator according to claim 1 wherein said audible sounding means is enabled for a specific period of time when said specific program instruction is sensed during processing of said program instruction data by said processing means, said specific program instruction being an END instruction indicative of the completion of said processing by said processing means.

3. The programmable calculator according to claim 1 wherein said audible sounding means is enabled for a specific period of time when said specific program instruction is sensed during processing of said program instruction data by said processing means, said specific program instruction being a HALT instruction indicative of the completion of a portion of said processing by said processing means to allow new data to be entered for a succeeding processing operation.

4. The programmable calculator according to claim 1 wherein said audible sounding means is enabled for a specific period of time when said specific program instruction is sensed during processing of said program instruction data by said processing means, said specific program instruction being a PAUSE instruction indicative of the completion of a portion of said processing by said processing means prior to the commencement of a succeeding processing operation by said processing means.

5. The programmable calculator according to claim 1, wherein said specific program instruction comprises:

an END instruction indicative of the completion of said processing by said processing means; and a HALT instruction indicative of the completion of a portion of said processing by said processing means to allow new data to be entered for a succeeding processing operation.

6. The programmable calculator according to claim 5, wherein said detector means comprises:
   a HALT code detector means for detecting the occurrence of said HALT instruction during processing by said processing means; and
   an END code detector means for detecting the occurrence of said END instruction during processing by said processing means.

7. The programmable calculator according to claim 6, wherein said second audible sound is generated in response to the occurrence of said HALT instruction detected by said HALT code detector means or to the occurrence of said END instruction detected by said END code detector means during processing by said processing means.

8. The programmable calculator according to claim 6, wherein said second audible sound is generated by said audible sounding means in response to the occurrence of said HALT instruction detected by said HALT code detector means during processing by said processing means;
said audible sounding means generating a third audible sound in response to the occurrence of said END instruction detected by said END code detector means during processing by said processing means.

* * * * *